Patented Jan. 13, 1942

2,269,772

UNITED STATES PATENT OFFICE 2,269,772

PHOSPHATIDE PRODUCT, AND PROCESS OF OBTAINING IT

Norman F. Kruse, Decatur, Ind., assignor to Central Soya Company, Inc., Fort Wayne, Ind., a corporation of Indiana No Drawing. Application May 17, 1940, Serial No. 335,865

12 Claims. (Cl. 260—403)

It is the object of my invention to produce a superior grade of lecithin or phosphatides from solvent-extracted vegetable oils, and to do so with economy.

In the solvent extraction of vegetable oils, as with benzine (including hexane-type solvents), benzol, mixtures of alcohol with benzine or benzol, etc., the oil-containing solvent extract is commonly treated first to remove most of the solvent, and thus to obtain a concentrated miscella which is rich in the extracted oil. Lecithin or phosphatides have heretofore been obtained from that concentrated miscella in various ways; but in general with less economy than is desirable. In addition, the separated lecithin or phosphatides so obtained have been in the form of a thin, watery emulsion, which had a high water-to-lecithin ratio, and an expensive vacuum-drying process was required to recover therefrom a lecithin-oil product of stable and marketable properties.

According to my invention, the lecithin or phosphatides are recovered from the concentrated miscella directly with a low water content, without the expensive vacuum-drying process previously needed, and thus a desirable and superior grade of lecithin or phosphatides is produced with greater economy.

According to my invention, I remove a large part of the extracting solvent, desirably at least 50% of it, from the solvent extract in the usual manner, by evaporation at or near atmospheric pressure. In this way I obtain a concentrated miscella. If desired, I may remove in this manner as much as 90% to 98% of the solvent originally in the solvent extract. I now remove substantially all the remainder of the solvent by vacuum stripping, by passing the concentrated miscella through a vacuum stripping column, which is maintained at a temperature above the boiling points both of water and of the extracting solvent under the conditions within the stripping column, and in which the remainder of the extracting solvent is removed. To facilitate that solvent removal, and also to deodorize the dissolved phosphatide or lecithin material without passing it through an intermediate precipitation, I do two things in this stripping column in the preferred form of my invention:

1. I maintain in the lower part of the stripping column a hot body of the oil, in which the phosphatides or lecithin are dissolved, so that the gases and vapors which are within the stripping column will not have access to the oil outlet at the bottom of the stripping column and complete separation of those gases from the oil before it leaves that stripping column will be ensured; and I control the upper level of that body of oil as desired to obtain the optimum results.

2. I discharge into the vacuum stripping column a small amount of live steam, of the order of 1% to 3% by weight of the oil passed through the column; which steam may be discharged either into the hot body of oil in the lower part of the stripping column or at a slight distance above that hot body of oil, or both, and helps to carry off any residual solvent that may approach the bottom of the stripping column or may even get into the upper part of the hot body of oil, and also carries off volatile materials which may be in the oil and which cause disagreeable odors and taste.

The body of oil in the lower part of the stripping column is maintained definitely at a temperature above the boiling points both of the extracting solvent and of water, at the pressure within the stripping column.

In an alternative form of my invention, I may omit altogether or make very small the hot body of oil in the lower part of the stripping column, by using a stripping column of the bubble-cap tower type, in which there are a number of plates upon which individual small quantities of the oil or oil-solvent mixture are held for scrubbing with the small quantity of steam that is supplied to the stripping column.

The temperatures and the quantity of steam admitted to the stripping column are so adjusted, in the preferred operation of my process, that the oil which is drawn off from the bottom of the stripping column is free from solvent down to a few parts per million, and contains water only to a fraction of 1% and in sufficiently small amount that the oil as withdrawn is clear by reason of the complete solution at that point of both phosphatides and water.

This clear oil, which contains the phosphatides or lecithin and the small amount of water, is then cooled, and treated to cause coagulation of a large part of the phosphatides or lecithin contained in the oil. This may be done to some extent by mere cooling. But it may be done better, and I prefer to do it, by adding a small amount of additional moisture (either liquid water or water vapor) after the cooling, and/or by adding a relatively small proportion of a crude oil which is already rich in phosphatides and lecithin. That crude oil may be the concentrate taken from the bottom of a settling tank of oil, whether that oil has already been treated to remove part of the phosphatides or lecithin therefrom or not. The phosphatides or lecithin coagulate in a hydrated form.

After the coagulation of the phosphatides or lecithin, by reason of the coagulating steps outlined above (including the cooling of the oil in all cases and in some cases the addition of moisture and/or of phosphatide-rich crude oil), the oil is passed through a centrifuge, by which the coagulated lecithin or phosphatides are collected at one point, and the oil with any remaining dissolved phosphatides or lecithin which it may contain is collected at another point. The degree of separation between the phosphatides are lecithin collected at the one point and the phosphatides or lecithin which remain dissolved in the oil collected at the other point may be varied by controlling the conditions of operation. The centrifuge used may be one in which the lecithin or phosphatides, now a non-flowing wax, are collected in the bowl, and removed from the bowl in any suitable way, as in batches, or may be one in which both the liquid oil and the nearly solid lecithin or phosphatides are both discharged, but at separate points, by the centrifuge itself.

The lecithin or phosphatide fraction thus obtained has a high percentage of acetone-insoluble material, a low oil content, and a very low moisture content, by reason of the small amount of water used in the process. This low moisture content is of value in getting a lecithin of greater solidity and of better keeping qualities; and this is a desirable and marketable product which is thus obtained directly from the centrifuge without further treatment. The moisture content may be varied as by controlling the moisture used in the process, and the proportion of phosphatide-rich crude oil (if any) added.

If for instance the oil is a solvent-extracted soybean oil—and my process is especially adapted for such solvent-extracted soybean oils—I may get a soybean lecithin or phosphatide fraction in which the high percentage of acetone-insoluble material is of the order of 50% to 75%, the low oil content is of the order of 20% to 30%, and the very low moisture content may be regularly kept below 10% and by proper control may if desired be gotten as low as 5%, or even 3%. This soybean lecithin or phosphatide fraction is of such character and consistency, as directly obtained by my process, that at room temperature and without the addition of any organic material not originally associated with it in the soybeans, it is waxy and nearly solid, "short," kneadable, and non-flowing.

The oil which is obtained from the centrifuge contains some lecithin or phosphatides, but a much smaller amount thereof than the oil that comes through from the bottom of the stripping column. By reason of thus removing lecithin or phosphatides from the oil, I not only get the removed lecithin or phosphatides as a marketable product, but also get an oil which has a lighter color and can be refined with a smaller loss.

I claim as my invention:

1. A crude phosphatide fraction separated directly as a waxy material from vacuum-stripped solvent-extracted vegetable oils containing it by adding to such a vegetable oil both a small amount of moisture and a crude oil which is high in phosphatide content, which fraction is substantially free from volatile materials that cause disagreeable odors and taste, and has a high content of acetone-insoluble material, a low oil content, and a moisture content of between 3% and 10%.

2. A crude phosphatide fraction separated directly as a waxy material from vacuum-stripped solvent-extracted vegetable oils containing it by adding to such a vegetable oil a small amount of moisture, which fraction is substantially free from volatile materials that cause disagreeable odors and taste, and has a high content of acetone-insoluble material, a low oil content, and a moisture content of between 3% and 10%.

3. A crude soybean phosphatide fraction separated directly as a waxy material from vacuum-stripped solvent-extracted soybean oil containing it by adding to such a vegetable oil both a small amount of moisture and a crude oil which is high in phosphatide content, which fraction is substantially free from volatile materials that cause disagreeable odors and taste, and has a high content of acetone-insoluble material, a low oil content, and a moisture content of between 3% and 10%.

4. A crude soybean phosphatide fraction separated directly as a waxy material from vacuum-stripped solvent-extracted soybean oil containing it by adding to such a vegetable oil a small amount of moisture, which fraction is substantially free from volatile materials that cause disagreeable odors and taste, and has a high content of acetone-insoluble material, a low oil content, and a moisture content of between 3% and 10%.

5. A crude soybean phosphatide fraction which has a content of acetone-insoluble material of between 50% and 75%, a moisture content of between 3% and 10%, and an oil content of residual soybean oil of between 20% and 30%; and which at room temperature and without the addition of any organic material not originally associated with it in the soybeans is waxy, short, kneadable, and non-flowing, and is substantially free from volatile materials which cause disagreeable odors and taste.

6. The process of obtaining phosphatides from solvent-extracted vegetable oils containing it, which consists in passing the concentrated miscella obtained by removing most of the solvent from a solvent-extract of vegetable oil through a vacuum stripping column maintained at a temperature definitely above the boiling point of water under the conditions within the column, discharging a relatively small amount of steam into that stripping column, withdrawing oil from the column with any contained phosphatides in solution, cooling said withdrawn oil, adding a small amount of water to the cooled oil to coagulate part of the phosphatides in the oil, and then recovering coagulated phosphatides containing a small amount of water from the body of the oil and any phosphatides which remain dissolved in the oil.

7. The process of obtaining phosphatides from solvent-extracted soybean oil, which consists in passing the concentrated miscella obtained by removing most of the solvent from a solvent-extract of vegetable oil through a vacuum stripping column maintained at a temperature definitely above the boiling point of water under the conditions within the column, discharging a relatively small amount of steam into that stripping column, withdrawing oil from the column with any contained phosphatides in solution, cooling said withdrawn oil, adding a small amount of water to the cooled oil to coagulate part of the phosphatides in the oil, and then recovering coagulated phosphatides containing a small amount of water from the body of the oil and any phosphatides which remain dissolved in the oil.

8. The process of obtaining phosphatides from solvent-extracted vegetable oils containing it, which consists in passing the concentrated miscella obtained by removing most of the solvent from a solvent-extract of vegetable oil through a vacuum stripping column maintained at a temperature definitely above the boiling point of water and of the extracting solvent under the conditions within the stripping column, maintaining a pool of the oil in the lower part of that stripping column, discharging into that stripping column below the level of said pool a relatively small amount of steam at a temperature also above the boiling point of the extracting solvent, withdrawing oil from the pool with any contained phosphatides in solution, cooling said withdrawn oil, adding a small amount of water to the cooled oil to coagulate part of the phosphatides in the oil, and then recovering the coagulated phosphatides containing a small amount of water from the body of the oil and any phosphatides which remain dissolved in the oil.

9. The process of obtaining phosphatides from solvent-extracted vegetable oils containing it, which consists in passing the concentrated miscella obtained by removing most of the solvent from a solvent-extract of vegetable oil through a vacuum stripping column maintained at a temperature definitely above the boiling point of water and of the extracting solvent under the conditions within the stripping column, maintaining a pool of the oil in the lower part of that stripping column, discharging into that stripping column a relatively small amount of steam at a temperature also above the boiling point of the extracting solvent, withdrawing oil from the pool with any contained phosphatides in solution, cooling said withdrawn oil, adding a small amount of water to the cooled oil to coagulate part of the phosphatides in the oil, and then recovering the coagulated phosphatides containing a small amount of water from the body of the oil and any phosphatides which remain dissolved in the oil.

10. The process of obtaining phosphatides from solvent-extracted vegetable oils containing it, which consists in passing the concentrated miscella obtained by removing most of the solvent from a solvent-extract of vegetable oil through a vacuum stripping column maintained at a temperature definitely above the boiling point of water and of the extracting solvent under the conditions within the stripping column, maintaining a pool of the oil in the lower part of that stripping column, discharging into that stripping column above the level of said pool a relatively small amount of steam at a temperature also above the boiling point of the extracting solvent, withdrawing oil from the pool with any contained phosphatides in solution, cooling said withdrawn oil, adding a small amount of water to the cooled oil to coagulate part of the phosphatides in the oil, and then recovering the coagulated phosphatides containing a small amount of water from the body of the oil and any phosphatides which remain dissolved in the oil.

11. The process of obtaining phosphatides from solvent-extracted vegetable oils containing it, which consists in passing the concentrated miscella obtained by removing most of the solvent from a solvent-extract of vegetable oil through a vacuum stripping column maintained at a temperature definitely above the boiling point of water and of the extracting solvent under the conditions within the stripping column, maintaining a pool of the oil in the lower part of that stripping column, discharging into that stripping colmun both above and below the level of said pool a relatively small amount of steam at a temperature also above the boiling point of the extracting solvent, withdrawing oil from the pool with any contained phosphatides in solution, cooling said withdrawn oil, adding a small amount of water to the cooled oil to coagulate part of the phosphatides in the oil, and then recovering the coagulated phosphatides containing a small amount of water from the body of the oil and any phosphatides which remain dissolved in the oil.

12. The process of obtaining phosphatides as set forth in claim 9, in which the vegetable oil is soybean oil.

NORMAN F. KRUSE.